(12) United States Patent
Schneider

(10) Patent No.: US 7,243,476 B2
(45) Date of Patent: Jul. 17, 2007

(54) METHOD AND SYSTEM FOR TRACKING ITEMS IN A SHIPPING FACILITY

(75) Inventor: Michael Schneider, Hessen (DE)

(73) Assignee: Checkpoint Systems, Inc., Thorofare, NJ (US)

( * ) Notice: Subject to any disclaimer, the term of this patent is extended or adjusted under 35 U.S.C. 154(b) by 49 days.

(21) Appl. No.: 11/292,019

(22) Filed: Dec. 1, 2005

(65) Prior Publication Data

US 2006/0131405 A1 Jun. 22, 2006

Related U.S. Application Data

(60) Provisional application No. 60/633,096, filed on Dec. 3, 2004.

(51) Int. Cl.
*B65B 11/04* (2006.01)
(52) U.S. Cl. .......................... 53/399; 53/441; 53/557; 53/587
(58) Field of Classification Search ............... 53/441, 53/557
See application file for complete search history.

(56) References Cited

U.S. PATENT DOCUMENTS

| | | | |
|---|---|---|---|
| 4,858,415 A * | 8/1989 | Hake ......................... | 53/438 |
| 4,991,381 A * | 2/1991 | Simons ...................... | 53/556 |
| 5,794,418 A | 8/1998 | Lai | |
| 5,920,287 A | 7/1999 | Belcher et al. | |
| 5,926,110 A | 7/1999 | Downs et al. | |
| 5,929,760 A | 7/1999 | Monahan | |
| 5,933,354 A | 8/1999 | Shimada et al. | |
| 5,936,527 A | 8/1999 | Isaacman et al. | |
| 5,953,234 A | 9/1999 | Singer et al. | |
| 5,959,568 A | 9/1999 | Woolley | |
| 5,963,134 A | 10/1999 | Bowers et al. | |

(Continued)

FOREIGN PATENT DOCUMENTS

JP          11-314617          11/1999

(Continued)

OTHER PUBLICATIONS

International Search Report mailing date May 24, 2006 for International Application No. PCT/US2005/043666.

(Continued)

*Primary Examiner*—John Sipos
(74) *Attorney, Agent, or Firm*—Caesar, Rivise, Bernstein, Cohen & Pokotilow, Ltd.

(57) ABSTRACT

A system for tracking items includes a turntable to receive a pallet containing articles having RFID devices, a wrap dispenser to wrap the articles with wrap as the turntable rotates and a transceiver disposed on the wrap dispenser to transmit and receive a signal from the RFID devices while the turntable is rotating and wrapping the articles. A method is provided including loading articles having RFID devices thereon on a pallet, loading the pallet on a turntable, attaching an end of a wrap to at least one of the articles, rotating the turntable to cause the wrap to encircle the articles until all of the articles are constrained in position by the wrap, transmitting a signal to the RFID devices to cause the each RFID device to emit a signal back to the transceiver, and reading the signals from the RFID devices to obtain information contained in the signals.

11 Claims, 6 Drawing Sheets

U.S. PATENT DOCUMENTS

| | | |
|---|---|---|
| 5,970,398 A | 10/1999 | Tuttle |
| 5,971,592 A | 10/1999 | Kralj et al. |
| 6,032,127 A | 2/2000 | Schkolnick et al. |
| 6,075,441 A | 6/2000 | Maloney |
| 6,076,023 A | 6/2000 | Sato |
| 6,081,237 A | 6/2000 | Sato et al. |
| 6,097,301 A | 8/2000 | Tuttle |
| 6,148,291 A | 11/2000 | Radican |
| 6,150,921 A | 11/2000 | Werb et al. |
| 6,154,137 A | 11/2000 | Goff et al. |
| D435,557 S | 12/2000 | Eisenberg et al. |
| 6,182,053 B1 | 1/2001 | Rauber et al. |
| 6,232,870 B1 | 5/2001 | Garber et al. |
| 6,335,686 B1 | 1/2002 | Goff et al. |
| 6,496,806 B1 | 12/2002 | Horwitz et al. |
| 7,050,938 B1 * | 5/2006 | Prater et al. ................. 702/182 |
| 7,161,489 B2 * | 1/2007 | Sullivan et al. .......... 340/572.4 |

FOREIGN PATENT DOCUMENTS

WO    WO 01/044082 A3    6/2001

OTHER PUBLICATIONS

INTERMEC "Application Guide" literature, XP-002379268, 2 pages, website: http://epsfiles.intermec.com/eps_files.

* cited by examiner

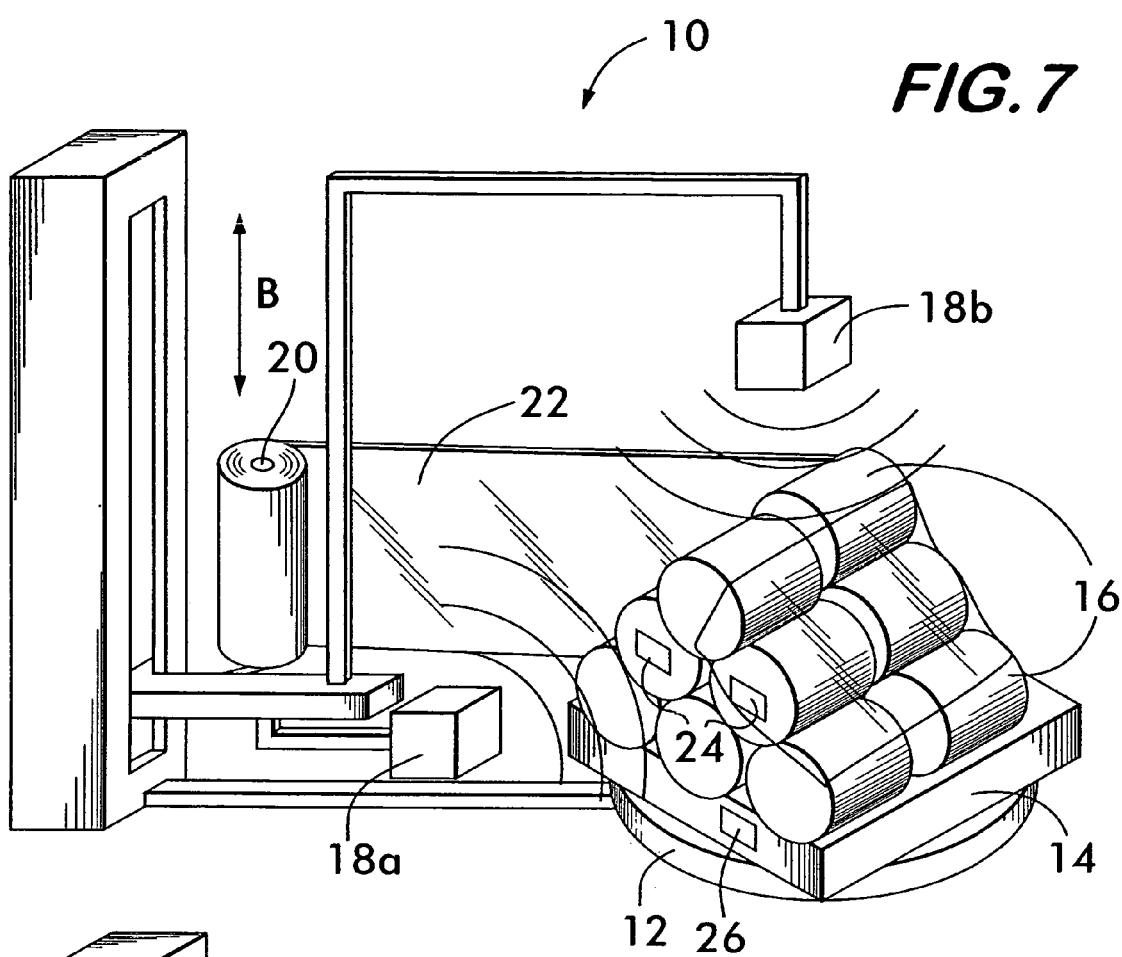
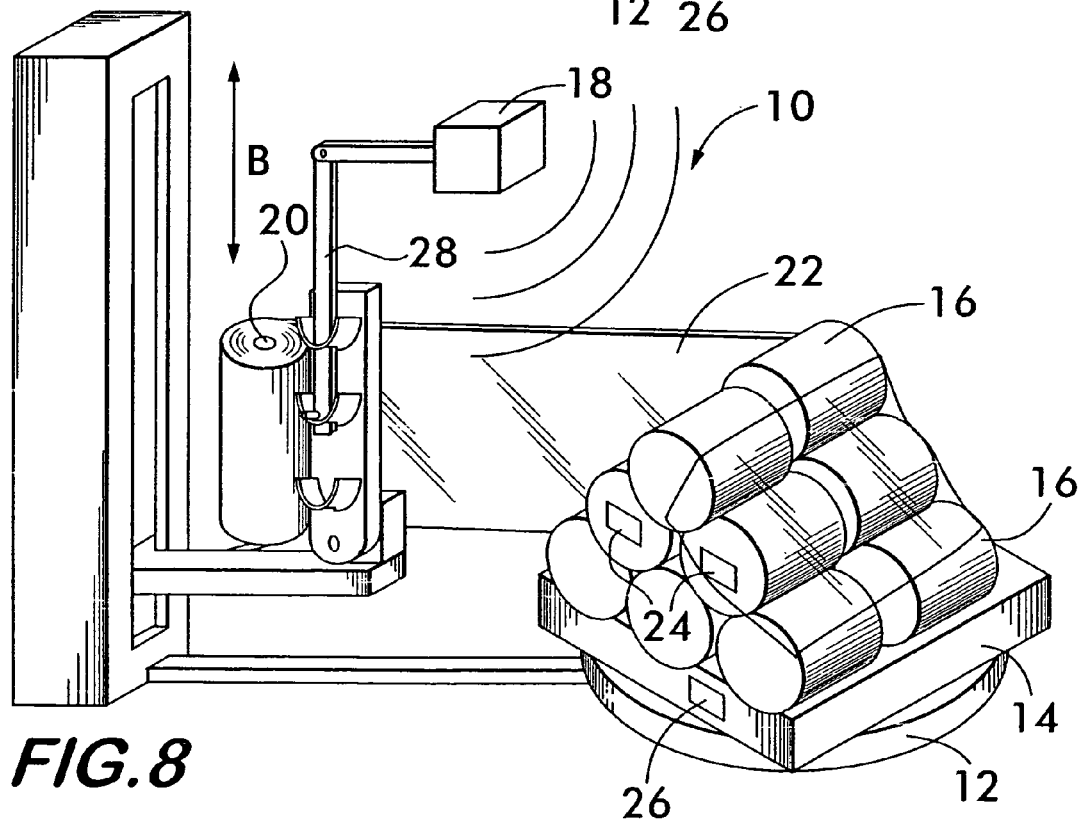
FIG. 7
FIG. 8

METHOD AND SYSTEM FOR TRACKING ITEMS IN A SHIPPING FACILITY

CROSS-REFERENCE TO RELATED APPLICATION

This application claims the benefit of U.S. Provisional Application Ser. No. 60/633,096, filed Dec. 3, 2004, entitled Method and System for Tracking Items in a Shipping Facility.

BACKGROUND OF THE INVENTION

1. Field of Invention

This invention relates to using radio frequency (RF) technology to catalog, track, and prevent inventory shrinkage of items. More specifically, the present invention relates to an improved method of tracking, cataloging and preventing inventory shrinkage of shipping pallets and contents contained thereon in shipping centers.

2. Description of Related Art

Shipping facilities typically have a system for cataloging, packaging, securing, and shipping items. For example, a shipping facility may receive clusters of grouped items, for example, twenty boxes of item "A," ten boxes of item "B," and ten bags of item "C." In the past, the items were cataloged either by hand or electronically, placed on a pallet (e.g., a wooden tray), packaged, and placed on a shipping vehicle, such as a truck, train, ship, or the like. This system is prone to errors. For example, a given company may receive over one thousand pallets a day and load over one hundred trucks. Each pallet must be directed to the right truck, at the right time, often in the right order. Within the shipping facility, there will be many different people loading different pallets onto trucks. As a result, errors happen. Errors are very costly to the shipping facility as errors result in late shipments or lost shipments.

It is highly desirable for a shipping facility to track exactly where each pallet in its system is at any given moment and into which specific shipping vehicle the pallet should be loaded. One solution is to log each item that goes onto a pallet either by hand or electronically. Logging inventory by hand has become excessively error prone and time consuming for large shipping facilities, so they have turned to electronic means for tracking inventory.

Electronic tracking of inventory offers numerous advantages. For example, electronic tracking can allow a company to track specific items on a specific pallet. Additionally, electronic tracking may automate and expedite the tracking process. It also can reduce errors and provide for real time data related to the tracking.

To accomplish electronic tracking, each item in a group is preferably electronically tagged with an RF (radio frequency) tag, preferably an RFID (radio frequency identification) tag. When activated by a transmitter or transceiver, the RFID tag identifies itself (by identifying, for example, the product and the serial number (SN) of the product within its range by transmitting a signal. A receiver listens for the RFID tag's transmission, and logs, for example, (1) the location of the tag by noting which sensor identified the tag and (2) the time the tag was activated.

For the purposes of the present invention the terms "RFID tag" and "RFID device" are used interchangeably.

Tags such as RFID tags must be within a specific distance range in order to be activated by a transmitter. That range depends on a variety of factors such as interference, strength of the original signal (i.e, the signal emitted by a transceiver), and the type of material that is tagged. The types of material upon which the tags are applied are very variable and affect results. For example, if the pallet contains metal cans, the range for the transmission is extremely limited. Generally, metallic and highly dense materials have the most adverse effect on signal transmission strength. Because of this property, locating only a single transmitter in a fixed location, as shown, for example, in FIG. 1, is typically not an effective method of accounting for all the products on the pallet. Due to this limitation, most presently existing shipping sensors include a transmitter gate, for example, as shown in FIG. 2. The gate of FIG. 2 uses a system of six transmitters and receivers. The tags are scanned when, for example, a forklift drives through the gate. This system is expensive to manufacture due to the quantity of transmitters and receivers, the cost of the gate, floor space of the gate, etc. This system is also complex to build. For example, the transmitters and receivers all need to be synchronized to work together. A less expensive, less complex, and less obtrusive system is desirable.

Numerous patents generally related to systems of the present type are known. For example, U.S. Pat. No. 5,920,287 (Belcher et al.) discloses a radio location system for precisely tracking objects by radio frequency (RF) tags. The tags randomly and repetitively emit identification signals.

U.S. Pat. No. 5,926,110 (Downs et al.) discloses programmable output devices for controlling signal levels in an RFID transponder.

U.S. Pat. No. 5,929,760 (Monahan) discloses an RFID antenna system that includes an antenna disposed proximate to an interrogation path for interrogating transponders moving along the interrogation path. The longitudinal axis of the antenna is substantially perpendicular to the interrogation path. The antenna provides an active RF interrogation zone.

U.S. Pat. No. 5,933,354 (Shimada et al.) discloses a system for controlling the physical distribution of pallets to accurately identify pallets. The system includes wireless detecting means mounted on pallets and for detecting pallet control information.

U.S. Pat. No. 5,936,527 (Isaacman et al.) discloses an apparatus and method for an RF document control system that enables the location of, for example, office files to be easily identified. A host transceiver transmits a coded RF signal at a first frequency to individually addressable transceivers located on shelves and/or drawers. Local exciters retransmit the coded RF signal at a second frequency via an antenna. A passive RFID tag, containing the same code as that transmitted by local exciter is attached to a document or file folder. When the document or file folder is in the vicinity of the exciter, the RFID tag is energized and second frequency is modulated. A computer coupled to the host transceiver enables the system to automatically and rapidly identify, down to a specific shelf or drawer, the specific location of the tagged document.

U.S. Pat. No. 5,953,234 (Singer et al.) discloses an automated storage facility that stores items on pallets. The system provides for order picking of stacked cases. The system includes a server, client personal computers, client RF terminals, etc.

U.S. Pat. No. 5,959,568 (Woolley) discloses a system for measuring distance where an object in a storage area or moving vehicle is monitored by attaching an electronic tag to the object. An electronic device detects the presence of the object by communicating with the tag while the object is in storage or is being moved by the vehicle. The tags may also determine the location of an attached object and reroute the object if it deviates from a given shipping schedule.

U.S. Pat. No. 5,963,134 (Bowers et al.) discloses an article inventory control system for articles such as books, and uses RFID tags attached to each article. An inventory database tracks all of the tagged articles and maintains circulation status information for each article. Articles are checked out of the library using a patron self-checkout system. Checked out articles are returned to the library by being deposited into an exterior smart book drop which reads the RFID tag and automatically checks the article back in.

U.S. Pat. No. 5,970,398 (Tuttle) discloses an RF antenna with current controlled sensitivity.

U.S. Pat. No. 5,971,592 (Kralj et al.) discloses an integrated reusable pallet having data collection devices. A method for controlling inventory and shipping is disclosed that allows for the tracking and control of reusable items having data storage devices. Storage and retrieval of data onto the data storage device of the reusable item is used in the method.

U.S. Pat. No. 6,032,127 (Schkolnick et al.) discloses an intelligent shopping cart that can automatically keep track of objects in the cart. The system provides the total price of the items carried to the user of the cart. The cart has a base station and an antenna.

U.S. Pat. No. 6,075,441 (Maloney) discloses a system for tracking objects such as keys. The system includes a plurality of units, each associated with an object to be tracked.

Each unit carries a memory device that stores a unique code identifying the unit and its associated object.

U.S. Pat. No. 6,081,237 (Sato et al.) discloses an antenna/mirror apparatus in which the space occupied by a low profile antenna is reduced with the internal space of a mirror case being utilized.

U.S. Pat. No. 6,097,301 (Tuttle) discloses a method of adjusting the two-way communication range of an RFID system to assist a human operator to individually handle and interrogate a plurality of tagged objects, such as suitcases, that each include an RFID tag. An RFID transceiver is mounted is mounted on the human operator.

U.S. Pat. No. 6,148,291 (Radican) discloses container and inventory monitoring methods and systems that provide detailed logistical control of containers, shipping racks, and resident and in-transit inventory. The methods and systems create and maintain accurate real time records of the location, movement and load status of containers, racks and inventory within the facility boundaries and between facilities such as factories, assembly plants, warehouses, etc.

U.S. Pat. No. 6,150,921 (Werb et al.) discloses an article tracking system for tracking mobile tags. Cell controllers with multiple antenna modules generate a carrier signal which is received by the tags. The tags shift the frequency of the carrier signal, modulate an identification code onto it, and transmit the resulting tag signal at randomized intervals. The antennas receive and process the response and determine the presence of the tags by position and triangulation. The cell controllers send data from the antenna to a host computer.

U.S. Pat. No. 6,154,137 (Goff et al.) discloses an identification tag that includes a magnetically-responsive element and an RF responsive element. The magnetically responsive element may function as an antenna for the radio frequency responsive element.

U.S. Des. Pat. No. 435,557 (Eisenberg et al.) discloses a design for a handheld interrogator.

U.S. Pat. No. 6,182,053 (Rauber et al.) discloses a method and apparatus for managing inventory in a warehouse with the aid of a computer. The method and apparatus is for receiving, sorting, marking, tracking, and selling inventory.

U.S. Pat. No. 6,232,870 (Garber et al.) discloses a handheld RFID device for use in connection with items that are associated with an RFID tag. Here, particular reference is made to library materials such as books, periodicals, and magnetic and optical materials.

U.S. Pat. No. 6,335,686 (Goff et al.) discloses an antenna shelf tape disclosed for use with items having RFID elements or tags associated with items of interest. Here, the antenna shelf tape includes multiple antennae, at least one of which can be selected to facilitate the interrogation of RFID elements adjacent to a selected antenna.

U.S. Pat. No. 6,496,806 (Horwitz et al.) discloses a method and system for tracking each item in a cluster of items. Each item has an associated ID. The method and system store item records. The item records include an associated item record for storing the item ID. Each item record is linked to the other item records.

All references cited herein are incorporated herein by reference in their entireties.

BRIEF SUMMARY OF THE INVENTION

A system for tracking items is provided which includes a turntable adapted to receive a pallet containing articles, the pallet and the articles having at least one RFID device thereon, at least one transceiver disposed adjacent to the turntable adapted to transmit a signal to the at least one RFID device and receive a signal from the RFID device, and a wrap dispenser to wrap the pallet containing articles with wrap as the turntable rotates.

The pallet may have at least one RFID tag mounted thereon. Each of the articles on the pallet may have at least one RFID mounted thereon. The wrap diespenser for wrapping the pallet and the turntable are preferably configured to move up and down relative to one another.

A system for tracking items is also provided which includes a turntable for receiving a plurality of articles, at least some of the plurality of articles each having an RFID device thereon, a column adjacent to the turntable for supporting a spool, the spool moveable up and down on the column, the spool having a roll of resilient film thereon, at least one transceiver disposed adjacent to the turntable, the transceiver configured to transmit a signal to transmit a signal to a plurality of RFID devices and receive return signals from the plurality of RFID devices, each the of the return signals containing data related to the articles having the RFID device thereon, and a processor for processing the data related to the articles having the RFID devices thereon.

Preferably, the spool moves up and down on the column by use of at least one electric motor. The turntable may be for receiving a pallet having the plurality of articles thereon. The pallet may have at least one RFID tag mounted thereon. Each of the articles on the pallet may have at least one RFID mounted thereon.

A method for tracking items is also provided which includes the steps of loading a plurality of articles on a pallet, at least one of the articles having an RFID device thereon, loading the pallet on a turntable, attaching an end of a roll of wrap to at least one of the articles or pallet, rotating the turntable to cause the wrap to encircle the articles on the pallet and continuing to rotate the turntable until substantially all of the articles are generally constrained in position by the wrap, transmitting a signal to the at least one RFID device to cause each RFID device to emit a signal back to the transceiver, and reading the signal from the RFID device to obtain information contained in the signal.

The method may include the step of removing the pallet from the turntable using a forklift. The method may also include the step of moving the pallet and the transceiver up and down with respect to one another during the step of rotating the turntable.

BRIEF DESCRIPTION OF SEVERAL VIEWS OF THE DRAWINGS

The invention will be described in conjunction with the following drawings in which like reference numerals designate like elements and wherein:

FIG. 7 is a simplified side view of an automatic film wrapper in accordance with FIG. 4, but having two transceivers in a different physical configuration than that of FIG. 6;

FIG. 8 is a simplified, side elevation view an automatic film wrapper in accordance with FIG. 4 having an adjustable transceiver attachment arm;

DETAILED DESCRIPTION OF THE INVENTION

Figure 1:
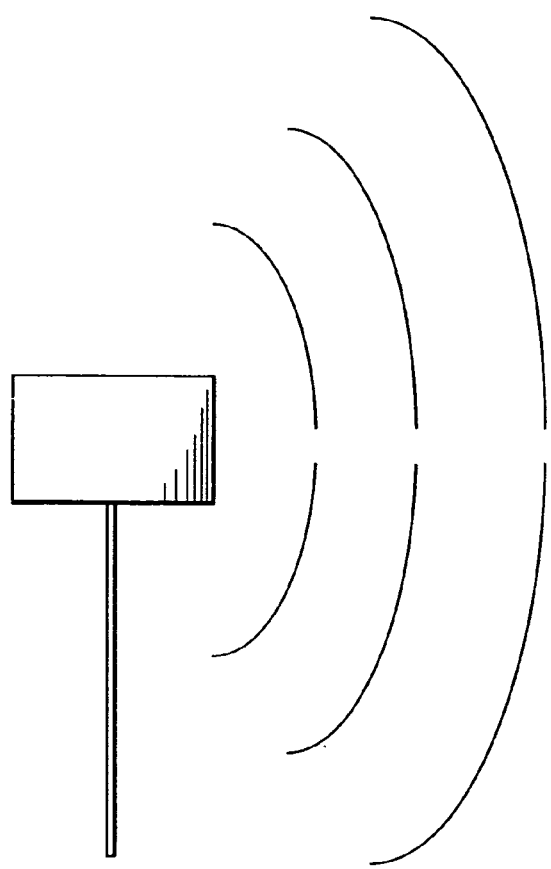
FIG. 1 is a simplified block diagram of a transceiver mounted on a rod for the detection of products, as known in the prior art.
Figure 1:
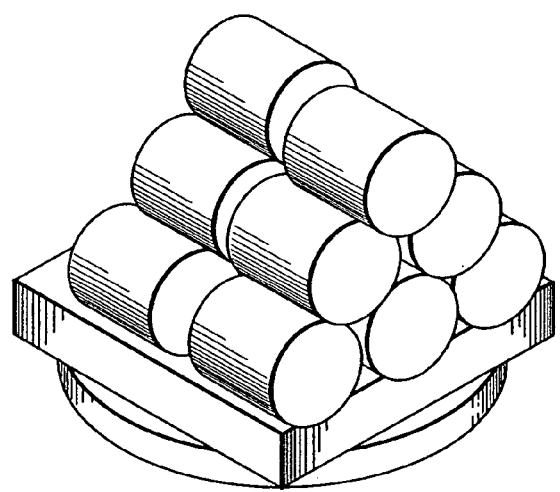
Figure 2:
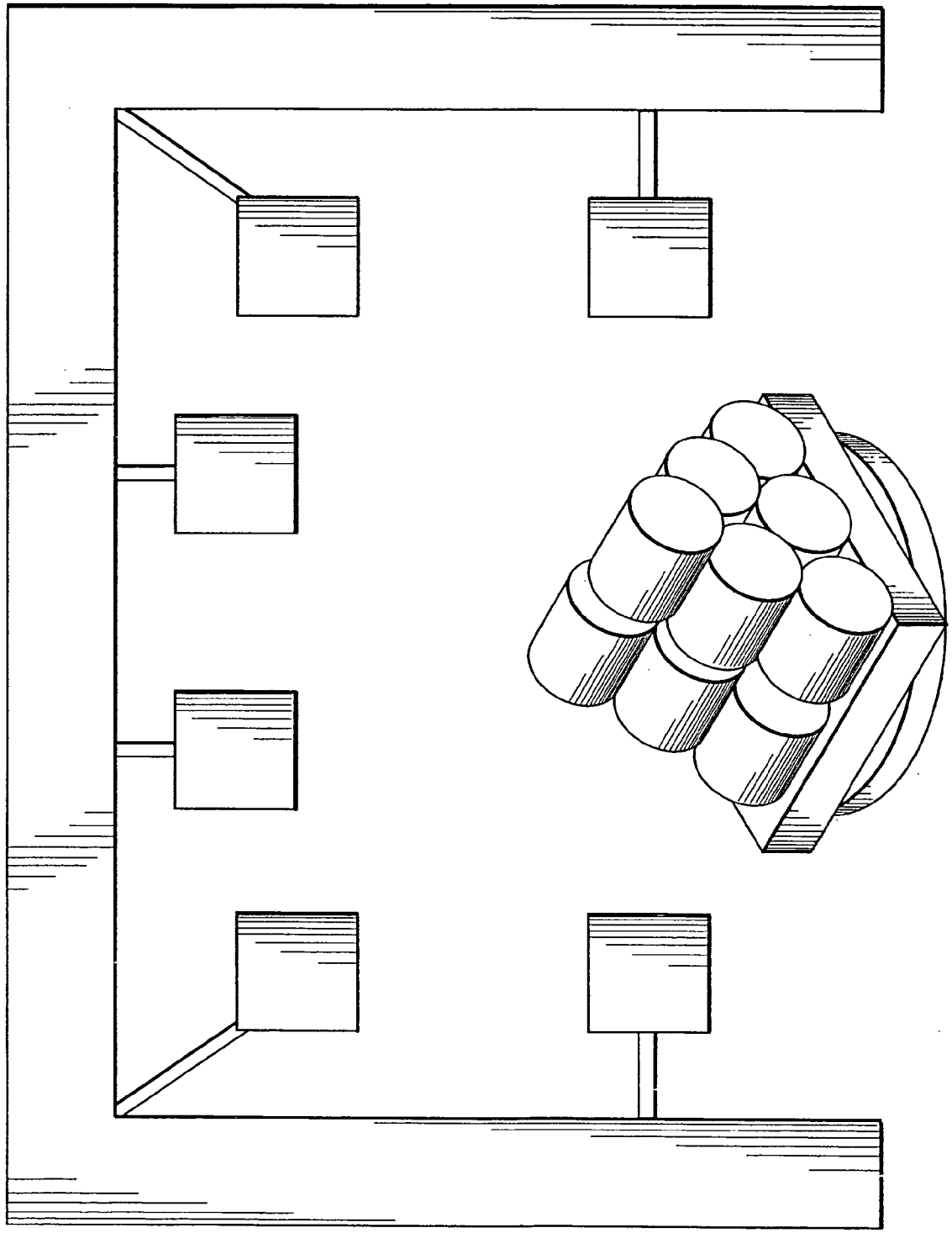
FIG. 2 is a simplified block diagram of a gate type transceiver, as known in the prior art.
Figure 3:
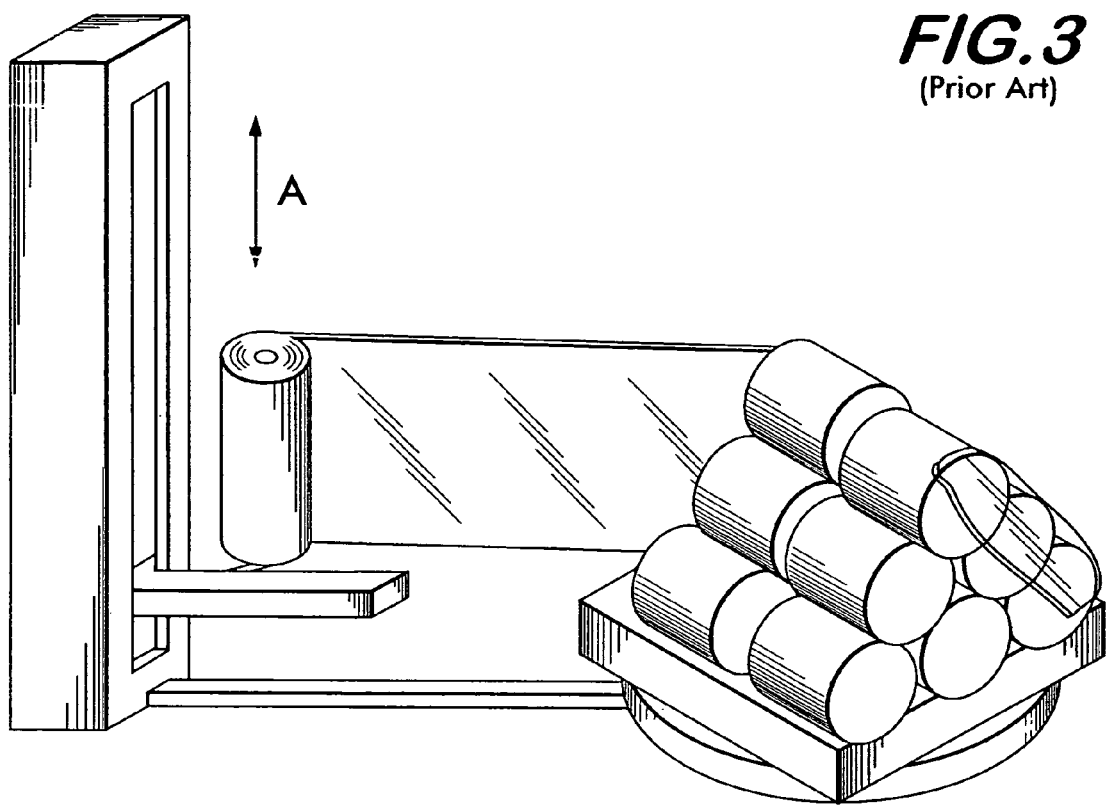
FIG. 3 is a simplified isometric view of an automatic film wrapper for products on a pallet, as known in the prior art.
Figure 4:
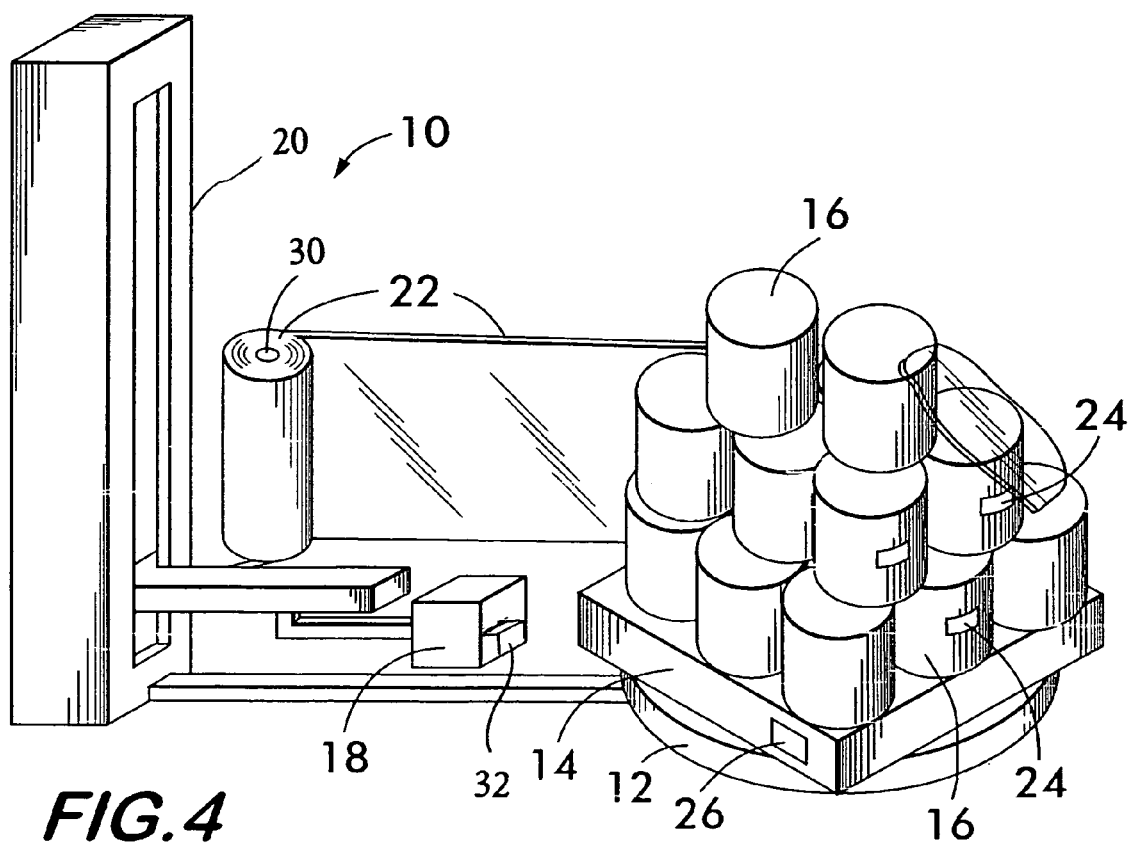
FIG. 4 is a simplified isometric view of an automatic film wrapper for products having a pallet with a transceiver disposed adjacent thereto in accordance with a first preferred embodiment of the present invention.
Figure 5:
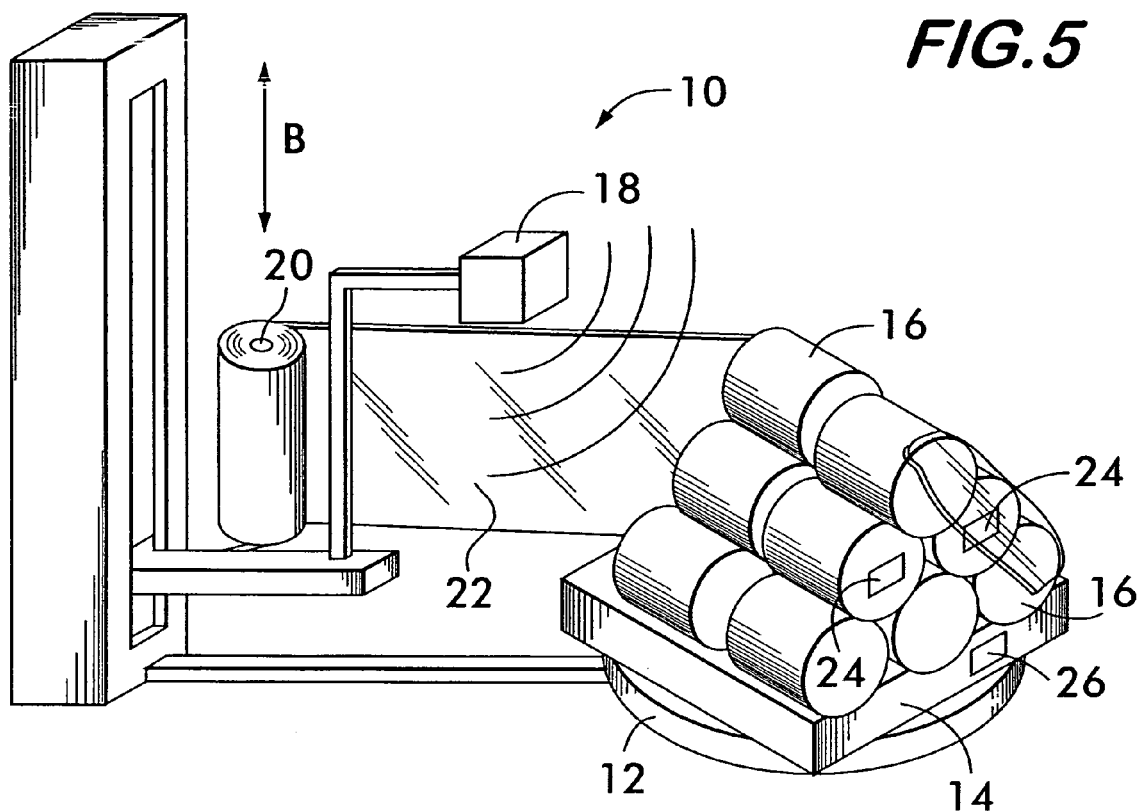
FIG. 5 is a simplified side view of the automatic film wrapper for products of FIG. 4.

Many shipping facilities have a process in which they package the products that they are shipping prior to the shipping of those products. Generally, the items are packaged by placing onto a spinning platform the following: (1) a pallet, (2) items on the pallet, each item having a RFID tag, and (3) an RFID tag on the pallet. For present purposes, these three items are collectively called a pallet complex. A wrapping dispenser wraps the pallet complex with a plastic wrap. This system is generally seen in FIG. 3. In the past, the wrapped pallet complex was picked up by a forklift, taken through a transmitter gate, and loaded on a truck. The transmitter gate read the RFID tags and collected data associated with the tags. For example, the location of the transmitter gate, the time the item went through the transmitter gate, and the like.

For example, U.S. Pat. No. 5,794,418 (Lai), the specification of which is incorporated in its entirety by reference, is directed to a pallet stretch wrapping machine that includes a turntable. A frame is vertically moveable along a column. A column supports a frame which has the capability of moving up and down on the column. The frame has a spool which contains a roll of resilient film. An end of the resilient film is placed on an article or plurality of articles that is placed, preferably, on a pallet on the turntable. The turntable having the pallet thereon is rotated such and the frame having the spool is moved up and/or down relative to the articles on the turntable such that the articles are fully wrapped upon several rotations of the turntable.

The present invention involves placing at least one transceiver adjacent to the wrap dispenser that performs the wrapping so that the at least one transceiver records the presence of the tags as the pallet complex is being wrapped. Since the platforms typically have the capability of up and down movement (i.e., an increase and decrease in elevation above the ground, as noted by arrows A in FIG. 3) while wrapping the pallet complex, the transceivers will be close to all RFID tags on the pallet during the wrapping process.

Therefore, the need for a separate transmitter gate is eliminated, the basic design is simplified, and a reduced number of transmitters may be used. A low cost tracking system is provided that does not require an extra step in processing (i.e., the steps of tracking and packaging are combined into one). Furthermore, the present invention does not use valuable warehouse floor space like a gate does.

Referring now to the drawing figures wherein like part numbers refer to like elements throughout the several views, there is shown in FIGS. 4 through 10 a system for tracking items 10 in accordance with a preferred embodiment of the present invention. The system for tracking items 10 generally comprises a turntable 12 adapted to receive a pallet 14 containing articles 16. At least one transceiver 18 is disposed adjacent to the turntable 12 and transmits a signal to at least one RFID device (tag) 24 that is located on one or more articles 16 and receives a signal from the at least one RFID devices. A wrap dispenser 20 for dispensing wrap wraps the pallet 14 containing articles 16 with wrap 22 from a spool 30 as the turntable 12 rotates.

The pallet 14 itself also may have at least one RFID tag 26 mounted thereon.

As can be seen, for example, by comparing FIG. 6 to FIG. 9, the wrap dispenser 20 for dispensing wrap to wrap the pallet 14 and the turntable 12 preferably move up and down relative to one another (direction B) such that articles 16 that are higher than a single width of wrap 22 may be wrapped.

A method for tracking items is also provided which includes the step of providing at least one transceiver 18 (which, as defined by the present invention, may be in the form of a separate transmitter and receiver and may include a processor to manipulate data) adapted to transmit a signal to at least one RFID device 24, 26 and receive a signal from the at least one RFID device 24, 26. The method continues with the step of loading articles on a turntable 12. At least one of the articles has an RFID device thereon. An end of a roll 34 of wrap 12 is attached to at least one of the articles 16 and the turntable 12 is rotated causing the wrap 22 to encircle the articles 16 on the pallet 14. The turntable continues to rotate until substantially all of the articles 16 are generally constrained in position by the wrap 22. During rotation of the turntable 12, a signal from the transceiver 18 is provided to the RFID devices 24, 26 to cause the RFID devices 24, 26 to emit a signal back to the transceiver 18. The transceiver 18 reads the signal from the RFID devices 24, 26 to obtain information contained in the signal. The information may be processed in a processor 32. The transceiver 18 either stores the information or is connected via a network to a computer system capable of analyzing the data.

The pallet 14 and the transceiver 18 may be moved up and down with respect to one another to ensure that all RFID devices are properly activated.

Figure 6:
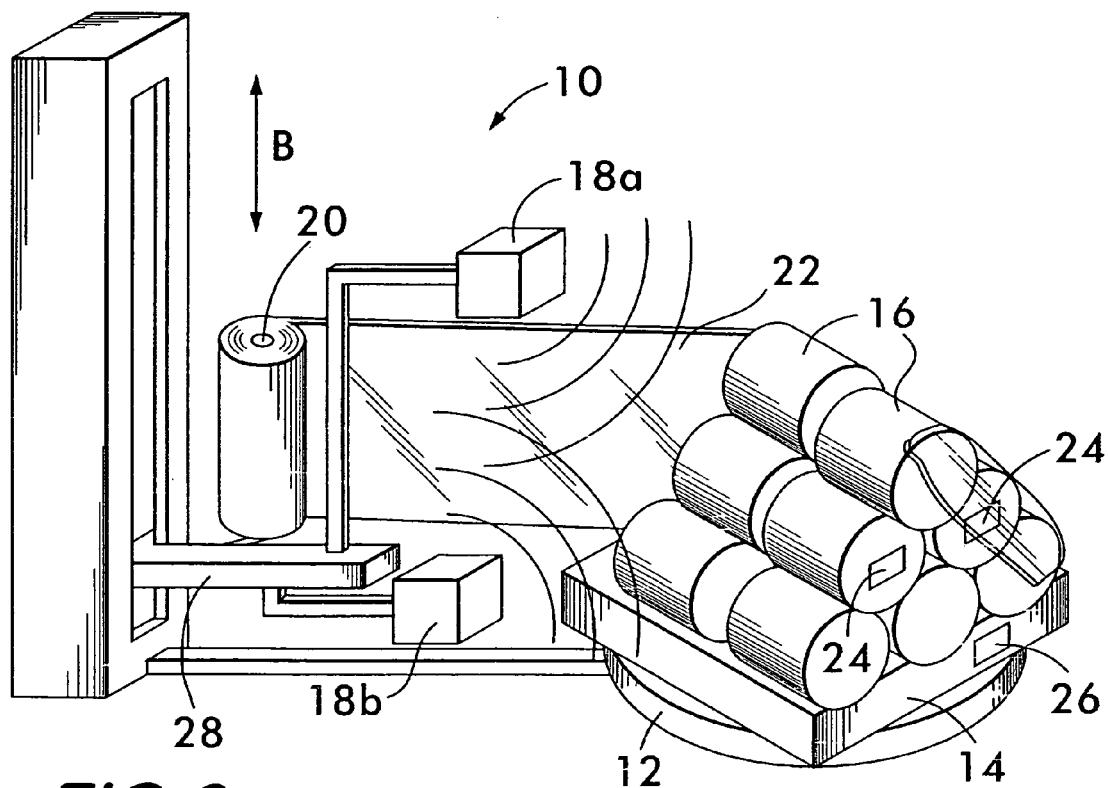
FIG. 6 is a simplified, side view of the automatic film wrapper in accordance with FIG. 4, but having two pallet transceivers.
Figure 9:
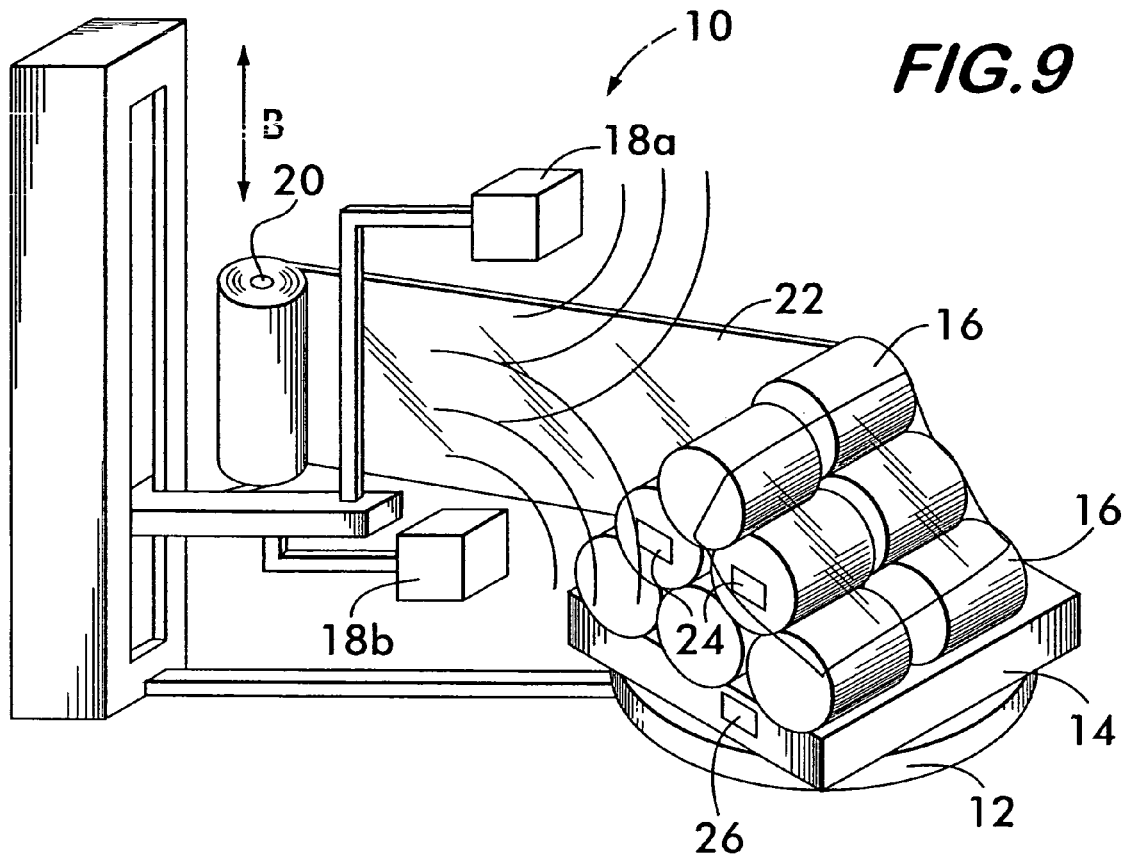
FIG. 9 is a simplified side view of the automatic film wrapper of FIG. 6 shown at a point later in time, wherein its wrap dispenser for wrapping is now elevated and the pallet turntable is rotated 90 degrees.
Figure 10:
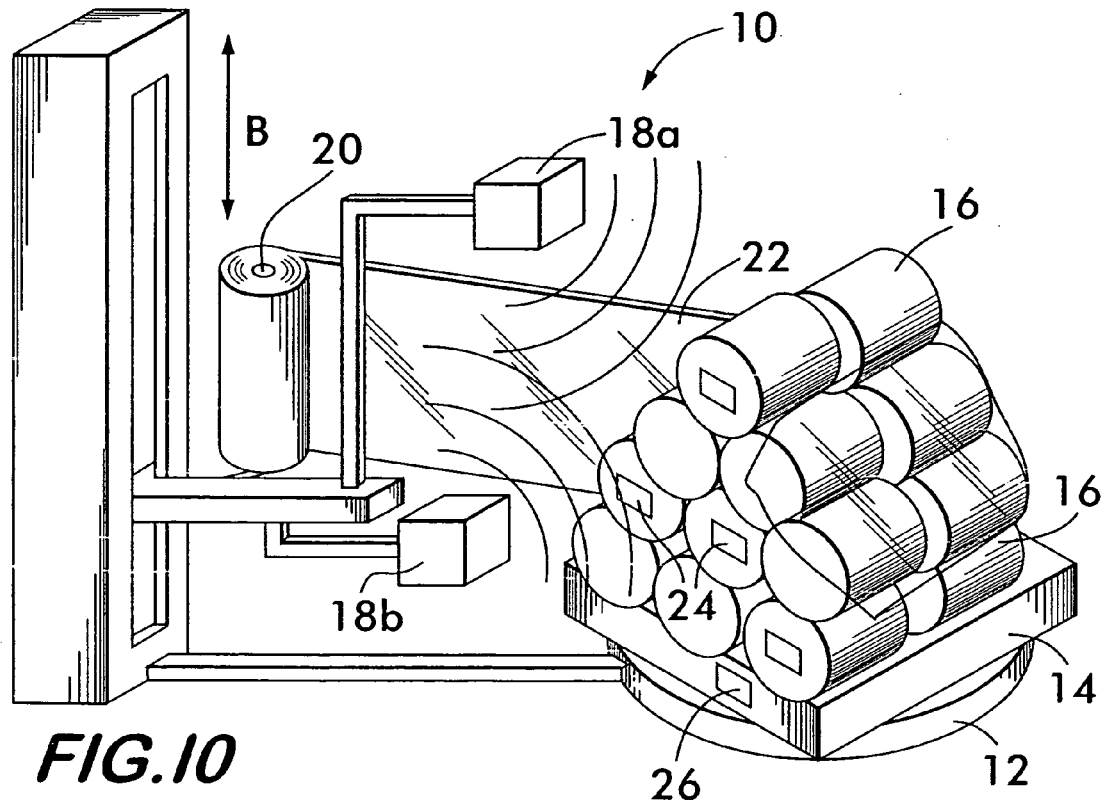
FIG. 10 is a simplified side view of the automatic film wrapper of FIG. 6 shown at a point later in time than that of FIG. 9, wherein the pallet contains additional tagged items.

As can be seen in FIG. 6 or FIG. 7, two transceivers 18*a*, 18*b* may be provided for increased coverage. Additionally, the transceivers may be located on an adjustable transceiver attachment arm 28.

Then, if necessary, a forklift is used to remove the pallet from the turntable 12.

While the invention has been described in detail and with reference to specific embodiments thereof, it will be apparent to one skilled in the art that various changes and modifications can be made therein without departing from the spirit and scope thereof.

What is claimed is:

1. A system for tracking items, comprising:
   (a) a turntable adapted to receive a pallet containing articles, said pallet and said articles having at least one RFID device thereon;
   (b) a wrap dispenser configured to dispense a wrapper and to wrap the pallet containing articles with wrap as the turntable rotates, and
   (c) at least one RF transceiver mounted on said dispenser adapted to transmit a signal to the at least one RFID device and receive a signal from the RFID device while said turntable is rotating and wrapping the articles.

2. The system for tracking items of claim 1, wherein the pallet has at least one RFID tag mounted thereon.

3. The system for tracking items of claim 1, wherein the each of the articles on the pallet has at least one RFID mounted thereon.

4. The system for tracking items of claim 1, wherein the wrap dispenser for wrapping the pallet and the turntable move up and down relative to one another.

5. A system for trackingitems, comprising:
   (a) a turntable for receiving a plurality of articles, at least some of said plurality of articles each having an RFID device thereon;
   (b) a column adjacent to the turntable for supporting a spool, the spool moveable up and down on the column, the spool having a roll of resilient film thereon;
   (c) at least one RF transceiver mounted on said column, the transceiver configured to transmit a signal to transmit a signal to a plurality of RFID devices and receive return signals from the plurality of RFID devices while said turntable is rotating and wrapping the articles, each of said return signals containing data related to the articles having the RFID device thereon; and
   (d) a processor for processing the data related to the articles having the RFID devices thereon.

6. The system for tracking of claim 5, wherein the spool moves up and down on the column by use of at least one electric motor.

7. The system for tracking items of claim 5, wherein the turntable is for receiving a pallet having the plurality of articles thereon.

8. The system for tracking items of claim 5, wherein the pallet has at least one RFID tag mounted thereon.

9. The system for tracking items of claim 7, wherein the each of the articles on the pallet has at least one RFID mounted thereon.

10. A method for tracking items, comprising:
    (a) loading a plurality of articles on a pallet, at least one of said articles having an RFID device thereon;
    (b) loading the pallet on a turntable,
    (c) providing a wrap dispenser adjacent the turntable;
    (d) mounting a RE transceiver on said wrap dispenser;
    (e) attaching an end of a wrap to at least one of the articles or pallet;
    (f) rotating the turntable to cause the wrap to encircle the articles on the pallet and continuing to rotate the turntable until substantially all of the articles are generally constrained in position by the wrap;
    (g) transmitting a signal from said transceiver to the at least one RFID device to cause each RFID device to emit a signal back to the transceiver while the turntable is rotating and wrapping the articles; and
    (f) reading the signal from the RFID device to obtain information contained in the signal during the wrapping operation.

11. The method for tracking items of claim 10, including moving the pallet and the transceiver up and down with respect to one another.

* * * * *